United States Patent [19]

Ruof

[11] 3,926,478
[45] Dec. 16, 1975

[54] FREQUENCY QUADRUPLER FOR ANTI-SKID WHEEL SPEED SENSOR

[75] Inventor: Edgar J. Ruof, Akron, Ohio

[73] Assignee: Goodyear Aerospace Corporation, Akron, Ohio

[22] Filed: July 1, 1974

[21] Appl. No.: 484,412

[52] U.S. Cl.............. 303/21 R; 307/220 R; 328/38
[51] Int. Cl.².. B60T 8/00; H03K 21/00; H03K 5/00
[58] Field of Search ....... 188/181; 244/111; 303/20, 303/21; 307/10 R, 220 R, 295; 317/5; 324/160–162; 328/20, 22, 26, 32, 38; 340/53, 62, 262–263

[56] References Cited
UNITED STATES PATENTS

| | | | |
|---|---|---|---|
| 3,566,159 | 2/1971 | Plunkett | 328/20 X |
| 3,578,819 | 3/1971 | Atkins | 188/181 A X |
| 3,648,062 | 3/1972 | Bozoian | 303/21 R UX |
| 3,682,512 | 8/1972 | Malon et al. | 303/21 P |
| 3,714,570 | 1/1973 | Howell | 328/26 X |
| 3,770,327 | 11/1973 | Ruof | 303/21 R |

*Primary Examiner*—Trygve M. Blix
*Assistant Examiner*—Stephen G. Kunin
*Attorney, Agent, or Firm*—F. W. Brunner; P. E. Milliken; E. W. Oldham

[57] ABSTRACT

A circuit for interconnection with a wheel speed transducer of the type which produces a characteristic sinusoidal output signal. The circuitry of the invention receives the sinusoidal output signal and rectifies the same by means of a precision rectifier. The precision rectifier has a feedback network to provide a gain; the gain being variable with frequency, input amplitude, and temperature. The output of the precision rectifier is capacitively coupled to an operational amplifier having the inputs thereof biased with respect to each other. The operational amplifier produces an output signal on each transition of the full wave rectified signal through a particular level. These signals are in turn capacitively coupled to a monostable multivibrator which, responsive to the outputs of the operational amplifier, produces output signals of fixed amplitude and pulse width.

6 Claims, 2 Drawing Figures

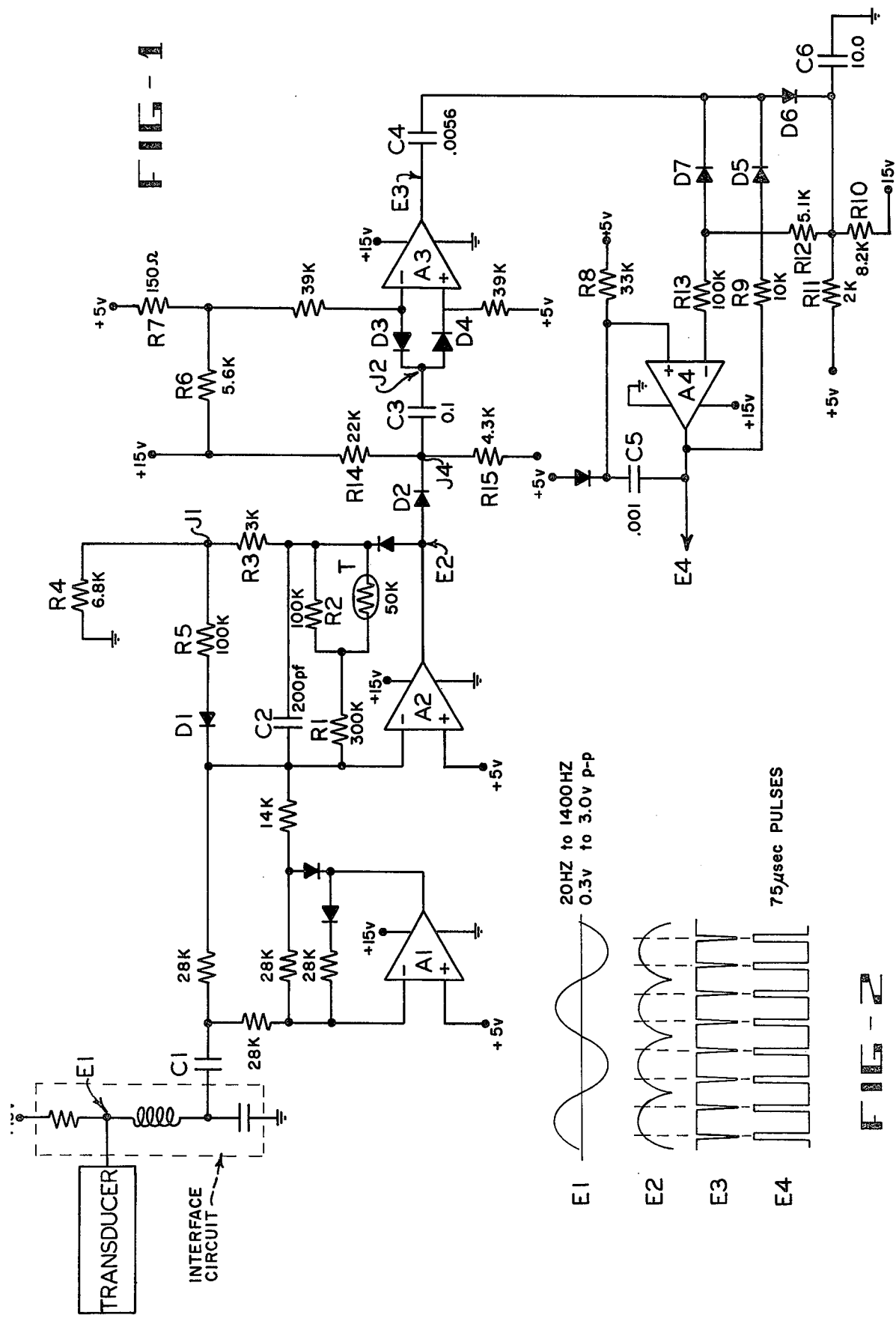

3,926,478

FREQUENCY QUADRUPLER FOR ANTI-SKID WHEEL SPEED SENSOR

BACKGROUND OF THE INVENTION

Heretofore in the art of anti-skid braking systems, it has been known to utilize a wheel speed transducer and exciter ring interconnected between the fixed axle and rotating wheel of a vehicle in order to acquire information relative to braking activity. In order to increase the resolution of such systems, approaches have been taken to increase the number of signals available from the wheel speed transducer during each revolution of the associated wheel. Such increased resolution will allow the anti-skid system to determine more readily that point at which a skid is occurring and will allow the system to better sense and analyze the frequency and amplitude changes coincident with gear walk. As is well known in the art, the gear walk phenomena occurs as a result of the flexing of the strut extending from the aircraft fuselage to which the wheel is affixed. As brake pressure is changed, the struts flex accordingly and result in amplitude and frequency variations in the output signal from the associated transducer. Control of the braking of the vehicle by using these signal variations can be better achieved with increased resolution from the transducer. Consequently, it is desirous to increase the number of signals produced by the transducer on each rotation of the wheel.

It is of course fundamental that more teeth could be placed upon the transducer and exciter ring to produce a greater number of signals per revolution. However, there are tight tolerances associated with transducer systems; the clearances between the transducer and exciter ring and the size of the teeth thereon must be commensurate with both tooth spacing and the diameter of the transducer and exciter ring. In other words, as is well known in the art, there is an upper limit at which an increase in the number of teeth in the transducer system results in a degradation of the signals produced therefrom. Of course, the number of teeth may be readily increased by correspondingly increasing the diameter of the exciter ring and transducer. However, present dictates of the aircraft industry are such that the size of the system must be maintained at a minimum and hence external methods, separate and distinct from the transducer system itself, must be devised for obtaining more information from wheel revolutions.

Consequently, it is an object of the instant invention to present a circuit adaptable for interconnection with a wheel speed transducer which substantially increases the number of information-bearing pulses created from each cycle of the signal produced by the transducer.

Yet another object of the invention is to present a circuit adaptable for increasing the number of information-bearing signals available from a wheel speed transducer and being responsive to signals from the transducer over a broad range of frequency and amplitude.

Still another object of the invention is to present a circuit adaptable for integration with a wheel speed transducer which is not adversely affected by operating temperature variations.

A further object of the invention is to present a circuit for operative engagement between a wheel speed transducer and DC converter for effectively increasing the number of information-bearing signals available from the transducer; the circuit being inexpensively constructed and highly accurate and reliable in operation.

These objects and other objects which will become apparent as the detailed description proceeds are achieved by the improvement of a circuit for increasing the amount of information obtainable from a sinusoidal wheel speed transducer output, comprising a full wave rectifier connected to the transducer for producing a full wave rectified signal from the sinusoidal output signal of the transducer; and circuit means connected to the rectifier for receiving the rectified signal and producing an output pulse on each of the rising and falling transitions of the rectified signal.

For an appreciation of the objects and structure of the invention reference should be had to the following detailed description and accompanying drawing wherein:

FIG. 1 is a schematic diagram of the circuitry of the invention; and

FIG. 2 is a graph illustrating various signals at particular points within the circuitry of FIG. 1.

Referring now to the drawing and more particularly FIG. 1, it can be seen that the circuitry of the invention is capacitively coupled through C1 to an interface circuit which is in turn connected to the transducer. The specific structure of the interface circuit will, of course, be dictated by the output circuitry of the transducer but suffice it to say that it is well within the ability of one skilled in the art to provide the proper interface circuitry to appropriately transfer the output signal from any of numerous available transducers to the coupling capacitor C1.

The sinusoidal output signal E1 from the transducer is coupled via C1 to the full wave precision rectifier comprised of operational amplifiers A1 and A2. The basic construction of such a precision rectifier is well known in the art and the functioning thereof to produce the full wave rectified signal E2 at the output of the amplifier A2 should be readily apparent.

The full wave recitifer is provided with a characteristic gain determined by the values of resistors R1 and R2 and the thermistor T. The characteristic gain of the feedback circuit is of course well known in the art but it should be noted that temperature compensation has been provided for in this stage by virtue of the presence of the thermistor T. Although temperature degradations of circuit operation occur as a result of the effect of temperature upon the diodes associated with the input circuitry of amplifiers A3 and A4, to be discussed hereinafter, it has been found to be more economical to provide the temperature compensation element at this stage of the circuitry rather than making such compensation in the subsequent stages. It should be readily apparent that as the ambient temperature increases the gain of the full wave rectifier decreases and as the temperature decreases the gain increases. This, of course, is all controlled by the negative temperature coefficient of resistance of the thermistor T.

Characteristic of many transducers is the increase of output signal amplitude at high frequencies. Consequently, at these higher frequencies less gain is required of the fullwave rectifier A1, A2 and thus the capacitor C2 is provided in shunt with the feedback resistor network R1, R2, T. The capacitor C2 functions as a roll-off capacitor and is thus selected for a value commensurate with the characteristics of the transducer and is of such nature as to dampen certain of the high frequency signals. Of course, the capacitor C2 also acts as a filter to eliminate the effect of high frequency noise coupled into the circuit. It should be noted that the presence of the capacitor C2 allows the specific circuit shown in FIG. 1 to function uniformly over a frequency range of from 20 to 1400hz.

Further provision is made for the uniform performance of the quadrupler circuit over a wide range of varying amplitudes of the transducer signal E1. It should be readily apparent from the particular circuitry shown in FIG. 1 that the the positive inputs of the amplifiers A1 and A2 are biased at plus 5 volts causing the output of the fullwave rectifier to be operative above this 5 volt level. Connected to the output of the fullwave recitifier is a voltage divider R3, R4 to ground. At the junction J1 of the voltage divider there is connected a resistor R5 and isolating diode D1 in shunt with the feedback resistors R1, R2 and T. It should be appreciated by those skilled in the art that above a particular output level of the voltage E2, the voltage of the junction J1 will be of sufficient amplitude to cause conduction through the resistor R5 and diode D1 so as to reduce the gain of the rectifier stage. This reduction of rectifier gain at output signals exceeding a preselected level further extends the uniformity of performance of the guadrupler circuit throughout a broader range of transducer signal amplitude. As shown in the particular circuity of the drawings, the gain is reduced when the output of amplifier A2 exceeds approximately 7.25 volts or a swing of 2.25 volts above the 5 volt reference.

The output of the precision fullwave rectifier is applied through the diode D2 to the coupling capacitor C3. This signal is coupled to the junction J2 between the diodes D3 and D4 which are respectively connected to the negative and positive inputs of the amplifier A3. Due to the voltage divider comprising the resistors R6 and R7, the biasing of the negative input of the amplifier A3 is slightly greater (preferably about 0.3 volts) than that of the positive input thereto. It should be apparent that with the coupling of the signal E2 through the diode D2 and the capacitor C3, the operational amplifier A3 will normally be on (the output being at a high level) except during the negative going excursions of E3 created by virtue of the biasing differential of the inputs of A3 and the interconnection of the diodes D3 and D4 at the junction J2. It should be readily appreciated that the negative doing excursions or spikes of E3 occur at substantially the same voltage level on both the rising and falling slopes of the signal E2. Consequently, the signals E3 are created four times per cycle of the transducer signal E1 and are produced at particular points with respect thereto.

The signal E3 will vary as to amplitude and pulse width because of the variations in frequency and amplitude of the voltage E2 and because of the slew rate of the amplifier A3. Since it is desirable that the output pulses of the guadrupler be of fixed amplitude and pulse width, a circuit is preferably provided to give consistency to the information-bearing signals to be applied to the conventional circuitry of the anti-skid system. To this end, the signal E3 is capacitively coupled across C4 to an input of the operational amplifier A4. The amplifier A4 operates as a monostable multivibrator or one shot which produces output signals of a fixed pulse width dependent upon the RC time constant of capacitor C5 and resistor R8. The pulse amplitude is also fixed by the amplitude of the supply voltage connected to the amplifier A4 as is well known in the art. A feedback is provided from the output of A4 through the resistor R9 and diode D5 to the coupling capacitor C4. This feedback circuit is provided to clamp-off the coupling of E3 across the capacitor C4 once the monostable multivibrator circuit of A4 has been triggered. Since the width of the pulses E3 varies quite widely with frequency, the feedback is provided to negate the possibility of double triggering or the like. The biasing of the negative input of the amplifier A4 by means of resistors R10 and R11 is such that only E3 signals and not small noise signals coupled into the circuit will effect the output of the one shot. Further provisions are made in this manner by the high impedance input resistor R13. The positive excursions of the E3 signal are driven through a low impedance path to ground through the diode D6 and capacitor C6. It is, of course, the negative excursions of the signal E3 which affect the one shot A4 by dropping the voltage at juction J3 through the resistors R12 and diode D7 connected to the capacitor C4.

As mentioned hereinabove, the diodes D3 – D7 associated with the amplifiers A3 and A4 create certain characteristic temperature-related changes which must be compensated for by means of the thermistor T in the gain feedback network of amplifier A2.

It should also be noted that there is provided a voltage divider circuit comprising resistors R14 and R15 interconnected between the 15 volt and 5 volt power supplies and joined together at the junction J4 which feeds the coupling capacitor C3. This network is provided such that at low frequencies the bottoms of the troughs of the signal E2 are flattened out and clamped at a level dependent upon the values of resistors R14 and R15 so that the voltage excursions across the capacitor C3 is lessened at low frequency to maintain a more uniform spacing of the pulses of E3. As the frequency of the output signal E1 of the transducer increases there is a natural roll off of the troughs due to the capacitor C2 in the feedback network of the amplifier A2. Thus, at low frequencies the divider network of R14 and R15 maintains the amplitude of voltage excursions across C3 while at higher frequency the capacitor C2 limits such excursions so as to maintain a proper signal integrity and uniformity of E3.

Thus it can be seen that the objects of the invention have been met by the quadrupler circuit presented hereinabove. The circuit is highly accurate and consistent in operation over a broad range of both frequency and amplitude of the input signal from the transducer. The output signal from the quadrupler is of a frequency dependent upon the input frequency from the transducer; but the output signals are of a fixed amplitude and pulse width and occur four times during each cycle of the transducer signal. There is hence available four times the information usually obtained from the transducer.

While in accordance with the patent statutes only the best mode and preferred embodiment of the invention have been presented and described in detail it is to be understood that the invention is not limited thereto or thereby. For an appreciation of the scope and breadth of the invention reference should therefore be had to the following claims.

What is claimed is:

1. In an anti-skid system, the improvement of a circuit for increasing the amount of information obtainable from a sinusoidal wheel speed transducer output, comprising a full wave rectifier connected to the transducer for producing a full wave rectified signal from the sinusoidal output signal of the transducer, the rectifier having a feed back capacitor in shunt with a resistive feed back network to dampen the gain of the rectifier when high frequency signals are received thereby, the resistive feed back network including a thermistor causing the characteristic gain of the rectifier to vary inversely with changes in the ambient temperature;

means connected to the resistive feed back network for reducing the gain of the rectifier when the amplitude of the signals received thereby exceeds a particular level;

an operational amplifier connected to the rectifier and having one input biased with respect to the other, and receiving the rectified signal at the inputs thereof; and a one-shot circuit connected to the circuit means and receiving the output pulses therefrom and creating pulses of fixed amplitude and duration in response to the output pulses.

2. The improvement of a circuit for increasing the amount of information obtainable from a sinusoidal wheel speed transducer output as recited in claim 1 wherein the inputs of the operational amplifier are series connected through two diodes, the rectified signal being applied at the junction of the diodes, and wherein a voltage divider circuit is interposed between the rectifier and the junction of the diodes for clamping the lower level of the rectified signal transitions.

3. The improvement of a circuit for increasing the amount of information obtainable from a sinusoidal wheel speed transducer output as recited in claim 1, wherein said means comprises a voltage divider connected to the resistive feed back network and a resistor and diode connected to the voltage divider and in shunt with the resistive network system.

4. A circuit for creating a plurality of uniform pulses in time-spaced relationship to a reference sinusoidal signal, comprising:

a full wave precision rectifier receiving said sinusoidal signal and creating a full wave rectified signal therefrom, said precision rectifier including a resistive feed back network providing a characteristic gain for said rectifier and a capacitor in shunt with said resistive feed back network for diminishing the gain of said rectifier at high frequency operation, said resistive feed back network including a thermistor for making the gain of said rectifier temperature variable;

an operational amplifier receiving said rectified signal, one input of the amplifier being biased with respect to another input with both inputs receiving said rectified signal, the operational amplifier producing an output pulse on each transition of said rectified signal through a particular level;

a voltage divider interposed between said rectifier and said operational amplifier to limit the level of the negative going transitions of the full wave rectified signals; and a monostable multivibrator receiving said output pulses from said operational amplifier and responsive thereto to produe output signals of fixed amplitude and pulse width.

5. The circuit according to claim 4 wherein said full wave rectified signal is capacitively coupled into said operational amplifier by way of a capacitor connected between said voltage divider and said operational amplifier.

6. The circuit according to claim 4 wherein said inputs of the operational amplifier are in series connection through two diodes, the rectified signal being applied to the amplifier at the point of interconnection of said diodes.

* * * * *